United States Patent
Del Giudice et al.

(10) Patent No.: US 12,254,083 B2
(45) Date of Patent: Mar. 18, 2025

(54) DYNAMIC ADAPTION OF A SECURE ELEMENT EXECUTION ENVIRONMENT TO PROFILES

(71) Applicant: IDEMIA IDENTITY & SECURITY, Courbevoie (FR)

(72) Inventors: Lauren Del Giudice, Courbevoie (FR); Rémy Cricco, Courbevoie (FR); Yannick Courquin, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 294 days.

(21) Appl. No.: 17/597,664

(22) PCT Filed: Jul. 23, 2020

(86) PCT No.: PCT/FR2020/051351
§ 371 (c)(1),
(2) Date: Jan. 17, 2022

(87) PCT Pub. No.: WO2021/019162
PCT Pub. Date: Feb. 4, 2021

(65) Prior Publication Data
US 2022/0327200 A1  Oct. 13, 2022

(30) Foreign Application Priority Data
Jul. 26, 2019 (FR) ...................... 1908501

(51) Int. Cl.
*G06F 21/00* (2013.01)
*G06F 21/53* (2013.01)
(Continued)

(52) U.S. Cl.
CPC ............ *G06F 21/53* (2013.01); *H04W 8/183* (2013.01); *H04W 8/205* (2013.01); *G06F 2221/03* (2013.01)

(58) Field of Classification Search
CPC ...... G06F 21/53; G06F 2221/03; H04W 4/60; H04W 12/35; H04W 12/37; H04W 8/22; H04W 8/183; H04W 8/205
See application file for complete search history.

(56) References Cited

U.S. PATENT DOCUMENTS

| | | | |
|---|---|---|---|
| 7,426,654 B2 * | 9/2008 | Adams, Jr. .............. | H04L 43/50 714/4.3 |
| 7,525,422 B2 * | 4/2009 | Bishop ................... | H04M 3/10 340/508 |

(Continued)

FOREIGN PATENT DOCUMENTS

| | | | |
|---|---|---|---|
| CN | 105933887 B * | 4/2019 | ............ H04W 8/183 |
| EP | 3606119 A1 | 2/2020 | |

OTHER PUBLICATIONS

V4 Na, et al. "SGP.02—Remote Provisioning Architecture for Embedded UICC Technical Specification", https://www.gsma.com/esim/esim-m2m-specifications/, Feb. 25, 2019 (Feb. 25, 2019), Retrieved from the Internet: https://www.gsma.com/newsroom/wp-content/uploads/SGP.02-v4.0.pdf; p. 20, paragraph 2.1—p. 26, paragraph 2.2.2 p. 28, paragraph 2.2.4—p. 30, paragraph 2.2.5 p. 31, paragraph 2.2.6—p. 32, paragraph 3 p. 46, paragraph 3—p. 82, paragraph 3.9 p. 105, paragraph 3.19—p. 114, paragraph 3.21.1.

*Primary Examiner* — Don G Zhao
(74) *Attorney, Agent, or Firm* — NIXON & VANDERHYE (57) ABSTRACT

An eUICC card comprising an initial runtime environment, subscriber profiles, associated adapters, and an adaptive routine configured to apply these adapters. An adapter enables the initial runtime environment to be adapted to the specificities of the corresponding profile when the latter is enabled. To enable dynamic adaptation of the runtime environment to the profiles used, the eUICC card further comprises inverse adapters associated with the profiles. The (Continued)

inverse adapter of the active profile makes it possible to restore the initial runtime environment upon disabling or deleting this profile. The adaptation can consist of modifying a Java class of the Java Card runtime environment of the eUICC, to the specificities of a profile.

18 Claims, 6 Drawing Sheets

(51) Int. Cl.
  *H04W 8/18* (2009.01)
  *H04W 8/20* (2009.01)

(56) References Cited

U.S. PATENT DOCUMENTS

| | | | | |
|---|---|---|---|---|
| 7,756,969 | B1* | 7/2010 | Clarke | H04L 9/40 709/224 |
| 7,933,235 | B2* | 4/2011 | Lott | H04W 52/34 370/252 |
| 8,140,980 | B2* | 3/2012 | Gunasekar | H04N 7/152 715/753 |
| 8,738,760 | B2* | 5/2014 | Adams, Jr. | H04L 43/50 709/224 |
| 8,812,649 | B2* | 8/2014 | Adams, Jr. | H04L 41/064 709/224 |
| 8,924,533 | B2* | 12/2014 | Adams, Jr. | H04Q 3/0075 709/224 |
| 10,368,219 | B2* | 7/2019 | Naik | H04W 8/205 |
| 2009/0125611 | A1* | 5/2009 | Barsness | G06F 9/44563 709/220 |
| 2009/0276754 | A1* | 11/2009 | Lind | G06F 9/466 717/106 |
| 2010/0012732 | A1 | 1/2010 | Pinzinger et al. | |
| 2012/0108204 | A1* | 5/2012 | Schell | H04W 8/205 455/411 |
| 2012/0174189 | A1* | 7/2012 | Lim | G06F 21/88 726/26 |
| 2012/0233300 | A1* | 9/2012 | Marmolejo-Meillon | G06F 15/781 709/221 |
| 2013/0036283 | A1* | 2/2013 | Hyvonen | G06F 13/28 711/E12.091 |
| 2014/0136865 | A1* | 5/2014 | Banerjee | G06F 1/3234 713/320 |
| 2014/0274032 | A1* | 9/2014 | Shipley | H04W 4/80 455/426.1 |
| 2015/0271662 | A1* | 9/2015 | Lhamon | H04W 8/183 370/329 |
| 2016/0014149 | A1* | 1/2016 | Bradley | H04L 63/1408 726/14 |
| 2016/0134991 | A1* | 5/2016 | Lee | H04W 12/082 455/419 |
| 2016/0316409 | A1* | 10/2016 | Upp | H04W 8/18 |
| 2017/0338954 | A1* | 11/2017 | Yang | H04W 12/35 |
| 2018/0041515 | A1* | 2/2018 | Gupta | G06F 21/53 |
| 2018/0249322 | A1* | 8/2018 | Kim | H04W 8/183 |
| 2018/0351945 | A1* | 12/2018 | Li | H04W 8/205 |
| 2018/0352422 | A1* | 12/2018 | Shah | H04L 67/303 |
| 2019/0020989 | A1* | 1/2019 | Naik | H04W 8/205 |
| 2020/0125668 | A1* | 4/2020 | Psaroudakis | G06F 9/45558 |
| 2020/0154522 | A1* | 5/2020 | Mustafic | H04L 9/32 |
| 2020/0245129 | A1* | 7/2020 | Lee | H04W 12/35 |
| 2020/0409669 | A1* | 12/2020 | Mohan | G06F 8/76 |

\* cited by examiner

DYNAMIC ADAPTION OF A SECURE ELEMENT EXECUTION ENVIRONMENT TO PROFILES

TECHNICAL FIELD

The present invention relates, in general, to the field of secure elements and more particularly to the management of their execution in such elements.

PRIOR ART

A secure element, SE, is a tamper-proof hardware component or platform (typically a chip or smart card) used in a host terminal (typically a mobile terminal) and capable of securely hosting applications and data in accordance with security rules and requirements set by trusted authorities.

An increasingly used form factor of the SE is the embedded Secure Element, eSE. This embedded secure element is generally soldered to the host terminal. A newer form factor is the integrated Secure Element, iSE. The secure element then becomes an integral part of the main processor (for example as a secure core in addition to other cores of the processor).

The secure elements are programmed according to the desired applications.

By way of example, an eSE or iSE can form the secure element necessary for many uses or services based on an NFC (Near Field Communication) communication implemented by a host mobile terminal. For example, an NFC payment service requires the secret banking information of the user that is advantageously stored in the eSE, protected from any unauthorized access. This is also the case for a public transport service where the eSE makes it possible to identify the user at ticket barriers.

Another example of a secure element is the embedded UICC (Universal Integrated Circuit Card) that provides the references of a subscriber to be authenticated on one or more mobile telephone networks, in particular via different operators. This is, for example, an eSE or iSE configured as a SIM (Subscriber Identity Module) card. This is known as an eUICC (embedded UICC) or iUICC (integrated UICC).

The main advantage of these secure elements is to offer multiple services using a single secure element. Multiple service providers must therefore load the data and/or applications into the same secure element allowing a user to access their services. These data and/or applications specific to a service provider for a user form a service profile stored in the secure element. In particular, profiles are known as defined by the GSMA RSP Technical Specification standard, Version 2.2 of Sep. 1, 2017 (below GSMA SGP.22) that are associated with mobile operators (service providers) and contain users' information allowing them to access their mobile telephone services. Configurations as defined by GlobalPlatform Card Specification (Version 2.3 of October 2015) standard are also known, which are associated with authorities (service providers) and contain the user's information allowing them to access their respective services.

Each service provider presents its own specificities that require adapting the runtime environment in the secure element, for example an operating system and/or a virtual machine (typically a Java Card system), in order to be able to use the matching service profile. However, these adaptations of one or more execution resources are not necessarily compatible from one profile to another.

In general, it would be beneficial to improve the management of the execution of a secure element including a service profile.

From the publication US 2010/012732, the use of corrective or "patch" data are known to update a smart card module after initialization thereof. However, this is to correct errors in the runtime environment. This approach does not make it possible to dynamically manage the runtime environment according to the execution profile(s).

The present invention aims to remedy these shortcomings.

Overview of the Invention

The invention relates first of all to a secure element comprising an initial runtime environment, a first service profile, adaptive data (or "adapter") of the initial runtime environment in a runtime environment adapted to the first service profile, an adaptive routine configured to apply the adaptive data to the initial runtime environment, characterized in that it further comprises inverse adaptive data (or inverse adapter) to restore the initial runtime environment from the adapted runtime environment, the adaptive routine being configured to apply the inverse adaptive data after using the first service profile.

Correlatively, the invention also relates to a method of execution in a secure element comprising an initial runtime environment and a first service profile, the method comprising the following steps:
  applying, through an adaptive routine, adaptive data of the initial runtime environment to obtain a runtime environment adapted to the first service profile,
  using the first service profile in the adapted runtime environment,
  then applying, through the adaptive routine, inverse adaptive data to the runtime environment adapted to restore the initial runtime environment.

By way of example, the adaptation may relate to a Java class often used in a secure element designed according to Java Card technology. In this case, the adaptive data are configured to adapt an initial Java class from the initial runtime environment to a format of an object instantiating the Java class in the first service profile, and the inverse adaptive data are configured to restore the initial Java class from the adapted Java class. Of course, other execution resources, such as applications loaded into the secure element, can be adapted.

The principle of adaptation of the present invention also applies in the situation where objects of the class have already been instantiated by other profiles.

The present invention thus makes it possible to dynamically adapt the runtime environment of a secure element to different loaded profiles that have their own specificities. Advantageously, the proposed mechanism of adaptation does not impact already existing infrastructures (in particular mobile telephone networks) while increasing the field accessible to service providers to adapt the runtime environment to their services. This results in greater freedom for them to offer new functionalities or new services.

Optional features of embodiments of the invention are defined in the dependent claims.

In one embodiment, the adaptive routine is configured to apply the adaptive data and the inverse adaptive data based on the life cycle of the first service profile. This approach provides efficient dynamic adaptation of the runtime environment.

For example, the adaptive routine is configured to apply the adaptive data to the initial runtime environment upon enabling the first service profile and to apply the inverse adaptive data to the adapted runtime environment upon disabling or deleting the first service profile. This arrangement ensures optimal operation of the enabled profiles.

Correlatively for the method according to the invention, the adaptive data and the inverse adaptive data are applied according to the life cycle of the first service profile, for example, the adaptive data are applied to the initial runtime environment upon enabling the first service profile and the inverse adaptive data are applied to the adapted runtime environment upon disabling or deleting the first service profile.

In one embodiment, the adaptive data and the inverse adaptive data are stored in the form of lists of directives interpretable by the adaptive routine.

This arrangement increases the possibilities of adapting the runtime environment compared to known techniques limited to a limited number of indirections (to an operating system) wherein a modification can be made. The applications and functionalities of the profiles may, as a result, be more varied.

In one embodiment, the adaptive data and the inverse adaptive data are stored in the first service profile or associated with this first service profile, for example in a memory reserved for the first profile. Also, each profile stores its own adaptive data. This makes it easier to use and manage the adaptive data for their application when the profile is for example enabled.

In one embodiment, the secure element comprises a communication means for receiving the adaptive data and the inverse adaptive data within a package transmitted by an external equipment, for example an installation package of the first service profile transmitted by a device from a customization site or by a remote network server, or even a package transmitted by a remote network server after the installation of the first service profile in the secure element. In particular, adaptive data and inverse adaptive data may be encapsulated as two additional components (called custom components in Java Card technology) of an application of the first profile within the package. No adaptation of existing installation mechanisms (provisioning according to the standards) is thus required.

Correlatively, for the method according to the invention, this further comprises receiving the adaptive data and the inverse adaptive data within a package transmitted by an external equipment, for example an installation package of the first service profile transmitted by a device of a customization site or by a remote network server, or else a package transmitted by a remote network server after the installation of the first service profile in the secure element.

In one variant, the secure element comprises a module for generating the inverse adaptive data from adaptive data received from a remote network equipment. Adaptive data may be received as an additional component of an application of the first profile in an installation package of that profile. The generation by the secure element of the inverse adaptive data makes it possible to reduce the risks of error in their generation. In this variant, the generation can now take into account the result actually obtained by applying the adaptive data to the runtime environment of the secure element (taking into account, for example, the hardware platform used), which a remote server cannot. This generation takes place during the adaptation of the runtime environment.

In a variant, this generation may take place when the profile is installed or when the profile is enabled for the first time.

Correlatively for the method according to the invention, it further comprises the generation, by the secure element, of the inverse adaptive data from the adaptive data received from a remote network equipment.

In one embodiment, the secure element further comprises a second profile (or more) selected from:
- a service profile that can be used in the initial runtime environment,
- a service profile that can be used in a modified runtime environment obtained by applying other adaptive data different from said adaptive data to the initial runtime environment, this service profile including the other adaptive data and other inverse adaptive data to restore the initial runtime environment from the modified runtime environment.

The application of the adaptive data and inverse adaptive data of different profiles may then be carried out according to their life cycles, that is as they are enabled, disabled, deleted.

In one embodiment, the secure element comprises a "garbage collector" collecting profile resources (for example objects, typically Java) not used (for example not referenced by the applications) stored in memory, the garbage collector being configured to collect only among the profile resources linked to one or several particular service profiles. The collection is generally carried out with a view to deleting unused resources, to free up memory space. The behavior of the garbage collector is thus adapted to the type of object to be collected, that is according to the targeted profile(s). It is thus possible to come and collect only one type of object.

The particular service profile(s) may consist of a single profile designated by an action or command as disclosed below, or be a set of profiles running on the same adapted runtime environment (that is profiles whose matching adaptive data are identical). By way of illustration, when a target profile is identified for collection by the garbage collector, the latter can extend collecting to all the profiles sharing the same adapted runtime environment as that of the target profile.

According to one characteristic, the particular service profile is an active service profile in the secure element. Collecting is thus carried out for the active profile, for example in response to a command to disable the active profile.

According to a variant, the particular service profile is the last active service profile. This layout may be used during a memory cleaning procedure when no profile is active.

According to another variant, the particular service profile is a service profile to be deleted. This situation therefore generally arises in response to a command to delete a profile.

In these two variants, the runtime environment is not adapted to the profile targeted by the collection. Also, the secure element can be configured to apply, before collecting, the adaptive data associated with the particular service profile (to adapt the runtime environment to the profile), and to apply, after collecting, the inverse adaptive data associated with the particular service profile (to restore the initial runtime environment). This makes it possible to carry out efficiently collecting targeted on objects specific to the profile concerned. In an embodiment specific to collecting for a profile to be deleted, the garbage collector collects, during said collection, the profile resources of the service profile to be deleted except for the inverse adaptive data associated with this service profile, and deletes the inverse adaptive data only after applying them. This arrangement guarantees a return to the generic runtime environment when deleting a profile. The secure element can thus continue to be used with the remaining profiles.

In a particular embodiment, the profile resources are stamped with an indicator representative of their respective execution profiles. This arrangement allows the garbage collector to efficiently search among the relevant resources.

In a particular embodiment, the profile resources may be collected spontaneously, that is, independently of the reception of a command (for example, of deletion or disabling). By way of example, collecting can be triggered in the event a memory saturation is detected of.

In this case in particular but not exclusively, the garbage collector can be configured to scan, that is, and as well-known to a skilled person, to read all the references of an object, the set of the objects of all the profiles and thus to proceed with collecting in the set of objects of all the profiles. This global "vision" of the garbage collector brings an increased precision, in the sense of being able to collect all unreachable objects, due to having the possibility of cleaning the whole memory.

Preferably, collecting is carried out only for the objects of the active profile in order to focus only on the current context. Other implementation choices are nevertheless possible according to the desired performance (precision of the collecting, in the sense of better cleaning of the memory, or reduced processing time).

The invention also relates to a computer program product comprising instructions configured for implementing the steps of the method hereinbefore whereupon said program is executed on a computer, as well as to a tangible medium comprising such a computer program product.

BRIEF DESCRIPTION OF THE DRAWINGS

Other particular features and advantages of the invention will become more apparent in the following description, illustrated by the appended figures which depict examples of non-limiting embodiments.

DETAILED DESCRIPTION

Figure 1:
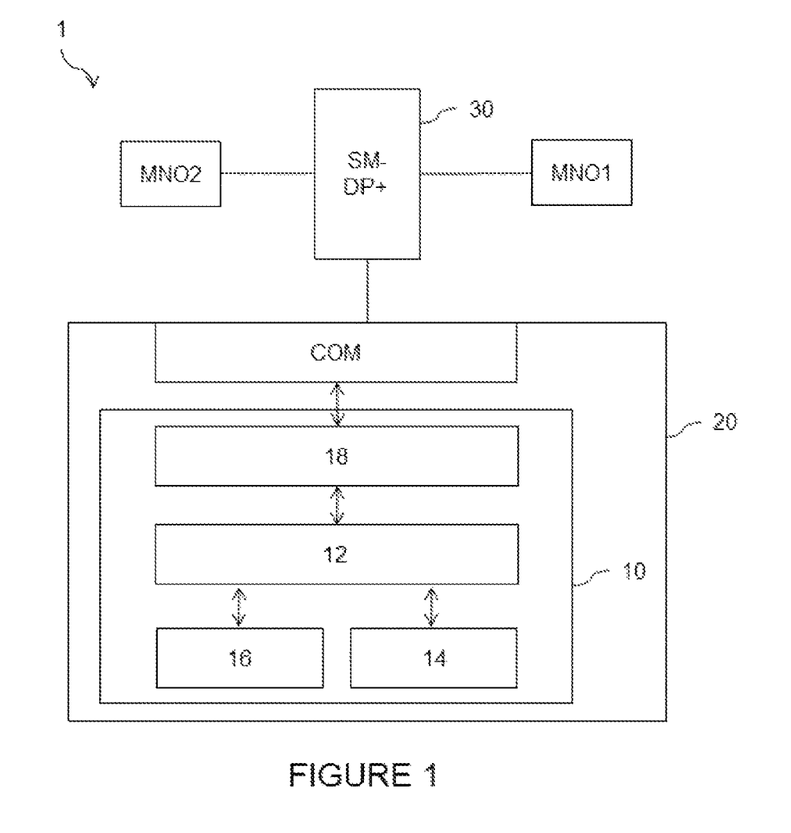
FIG. 1 shows a system wherein a secure element according to the invention is implemented.

FIG. 1 shows a system 1 wherein a secure element 10 according to the invention is implemented. By way of illustration, the system 1 shown is a mobile telephone system, although the invention applies to any system using a secure element 10 containing one or more execution profiles.

In this example, the secure element 10 is an eUICC embedded in a conventional host equipment 20, a mobile telephone-like device.

The secure element 10 can be any type of card module to be soldered or inserted in a removable manner into a secure element reader or the host device 20, examples of which are an eSE, an iSE, an eSIM (for embedded SIM), an SSP (for Smart Secure Platform, examples of which are iSIM (for integrated SIM) or ieUICC (for integrated eUICC). The host device 20 may be any of a mobile phone (for example, cellular or smart phone), a computer (for example, a laptop), a tablet, a portable communication apparatus, a portable computing apparatus (e.g., a personal data assistant), an entertainment apparatus (for example, a music or video apparatus, or a satellite radio), or any other suitable apparatus.

In the example of FIG. 1, the telephone 20 is connected to an SM-DP+30 server ("Subscription Manager Data Preparation or a server for preparing data and managing subscriptions) of a mobile network, which server receives data from different operators MNO1 and MNO2 in order to transmit them to subscribers. According to the implementation situations of the invention, the host terminal 20 can be connected to different types of remote servers 30. In particular, the SM-DP+ server can be replaced by two SM-DP and SM-SR servers.

The eUICC 10 (or more generally the secure element) includes:
- a processing unit 12—or microprocessor;
- one or several non-volatile memories 14 for example ROM (acronym for "Read Only Memory"), Flash, EEPROM (acronym for "Electrically Erasable Read Only Memory") or any type of hard disk;
- a live memory 16 or cache memory or volatile memory for example RAM (acronym for "Random Access Memory") comprising registers adapted to the recording of variables and parameters during the operation of the eUICC 10 of the terminal 20; when implementing the invention, the program instruction codes stored in non-volatile read-only memory are loaded into RAM memory with a view to being executed by the processing unit 12;
- one or several communication interfaces 18 adapted for exchanging (transmitting and receiving) data with the host terminal 20 and/or with the remote server 30 via a telecommunications network and a COM communication interface of the host terminal 20.

Figure 2:
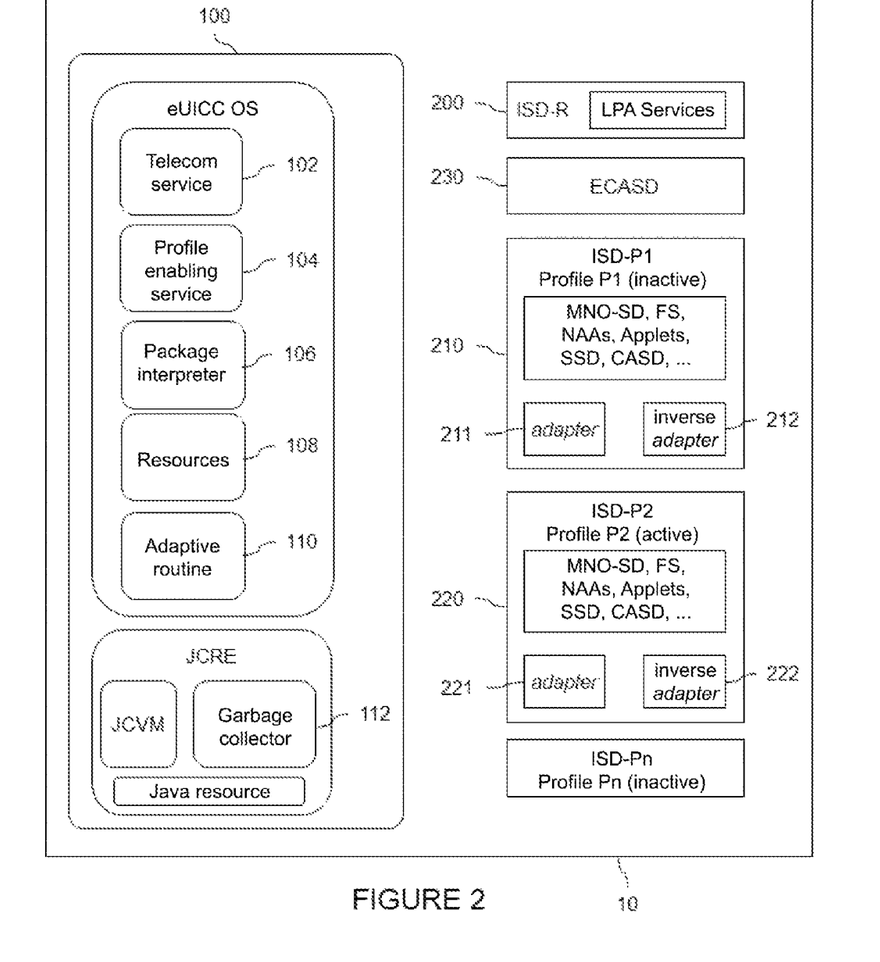
FIG. 2 shows an example of a high-level architecture of an eUICC 10 card for an implementation of the invention.

FIG. 2 shows an example of a high-level architecture of an eUICC 10 (generally a secure element) utilizing mobile telephony where it hosts several operator profiles MNO1, MNO2 allowing access to the mobile network of these operators (generally it hosts one or more execution profiles enabling access to respective services).

The eUICC 10 comprises a runtime environment 100, an ISD-R 200 root security domain, one or more (herein two) ISD-P profile security domains 210, 220 corresponding to two profiles P1 and P2, and an ECASD 230 domain.

The runtime environment 100 comprises, for example, the operating system OS of the eUICC 10. The runtime environment 100 may also comprise a JCRE runtime environment (generally comprising a JCVM virtual machine) executed by the OS when the eUICC 10 is designed in accordance with Java Card technology.

The runtime environment 100 includes a telecom service 102, a profile enabling service 104, a profile package interpreter 106, one or several resources 108 used by the installed profiles (for example by applications), an adaptive routine 110, and a garbage collector 112.

The telecom service 102 provides network authentication algorithms for the profiles (P1, P2) stored on the eUICC 10. The profile activation service 104 validates and enforces profile policy rules. The interpreter 106 translates profile packages (typically in CAP format) received into profiles (for example P1 and P2) installed on the eUICC 10.

The resources 108 used by the profiles can be of various types: data, applications, code (interpreted or native), API (application programming interface), functions, classes (addition, deletion, or modification of fields of a class). These resources 108 are "adapted" using adaptive data (hereinafter "adapter") in an implementation of the invention. In the following example, an "adaptable" resource is considered to be a Java Card class used by profiles P1 and P2. Nevertheless, the invention applies to the adaptation of any resource.

The adaptive routine 110 makes it possible to apply adaptive data to these resources 108 in order to obtain adapted resources. By applying adaptive data intended for a particular profile (thus adapted to an operator), it is then possible to adapt the runtime environment 100 to the profile considered, making it possible to ensure and support the specific functionalities intended in this profile. Advantageously, the adaptation can be carried out on the native code of the runtime environment. As a variant, the adaptation can be carried out on interpretable code of the runtime environment.

The example proposed below is based on the adaptation of class 108 to different profiles, for example by adding/modifying a field or a method of class 108. Of course, more resources can be adapted, which differ from one profile to another. Additionally, resources other than Java classes can be modified, for example code or data of an application loaded with the runtime environment 100.

According to the invention, the adaptive routine 110 also makes it possible to apply inverse adaptive data making it possible to restore the resource 108 to its initial state. Thus, it is possible to dynamically adapt the runtime environment 100 to a particular profile to be used: by applying the appropriate adaptive data to obtain the adapted resources used by the profile, then by applying, at the end of use, the inverse adaptive data to restore the initial resources.

The Garbage collector 112 in a Java environment, allows resources specific to profiles that are no longer in use to be collected, in order to delete them (in order to free memory). This involves, for example, collecting Java objects that are no longer reachable by the methods and other objects implemented.

In a known manner, the ISD-R 200 enables the creation of ISD-P profile security domains 210, 220 as well as the management of their life cycles, that is the installation of profiles P1 and P2, their enabling, disabling and deletions. Commands can thus be received by the ISD-R 200 from the remote server 30 or from an action (for example input, choice, click, etc.) carried out by the user on the host terminal 20, for the purpose of modifying the status of a profile.

If two execution profiles cannot be active at the same time, the enabling of an inactive profile is also interpreted as a request to disable the active profile. As a variant, two profiles can be active simultaneously, based on a same runtime environment (optionally adapted) or on different runtime environments, in which case the runtime environment is dynamically adapted in real time to the profile requesting execution.

Each ISD-P profile 210 or 220 security domain corresponds to a P1 or P2 profile for accessing the mobile network of an MNO1 or MNO2 operator. In a known manner, an ISD-P includes a certain number of elements (not shown) such as an MNO-SD (security domain of the operator containing cryptographic keys), supplementary security domains (SSD), a controlling authority security domain (CASD), applications (applets), a network access application (NAA) used to allow access to the operator's network using MNO-SD keys, profile data (including profile policy rules).

Each ISD-P profile security domain 210 or 220 (or profile P1 or P2) security domain further includes an adapter 211/221 and an inverse adapter 212/222.

The adapter 211/221 makes it possible to adapt the initial (or original) runtime environment 100 into a runtime environment adapted to the specificities of the profile P1 or P2 (and therefore of the associated operator). The adapter 211/221 corresponds to the binary difference between the initial runtime environment 100 and the runtime environment adapted to the specificities of the operator. The adaptation can relate to one or more execution resources 108.

The inverse adapter 212/222 makes it possible to restore the initial runtime environment 100 from the runtime environment adapted by the adapter 211/221. In other words, the inverse adapter 212/222 thus corresponds to the binary difference between the runtime environment adapted to the specificities of the operator and the initial runtime environment 100 that is not adapted. The restoration can relate to the adapted execution resource(s) 108.

The adapters are encapsulated in directives that can be interpreted by the adaptive routine 110, that is in the form of applications. Two lists of directives (corresponding to adapter and inverse adapter) can thus be stored in each profile, as objects. These objects can thus be easily recognized by the adaptive routine 110 as adapters to be executed. Their format (interpretable directives) advantageously makes it possible to dispense with the restrictive schemes of the background art wherein only indirections (list of certain addresses) are proposed for optional correction.

Although the profiles depicted in the figure each have an adapter and an inverse adapter, one or more profiles installed on the secure element 10 may have no adapter, especially if they do not require (for their use) any adaptation of the runtime environment 100 and its execution resources 108.

In the example, a profile (herein P1) is disabled when another profile (herein P2) is enabled. Other profiles can be provided, preferably disabled for the case where only one profile is active at a time within the secure element 10.

The ECASD domain 230 is responsible for securing the security domains 200, 210, 220 and the authentication functions of the eUICC 10, by storing the keys and other certificates associated with the security domains.

By virtue of the adapter and inverse adapter according to the invention, the runtime environment 100 can be dynamically adapted to a particular profile to be used, without constraint for the operator of the profile. In particular, it can be adapted dynamically during profile changes, that is according to the life cycle of the various profiles stored in the secure element 10.

Any type of execution resource 108 can be adapted dynamically, unlike known techniques generally limited only to the modification of certain predetermined resources (generally a list of possible indirections on these resources).

Appropriate management of the adapters as disclosed below (in particular using the inverse adapters to restore the runtime environment) thus makes it possible to coexist, within the same secure element 10, profiles that are potentially incompatible therebetween.

Figure 3:
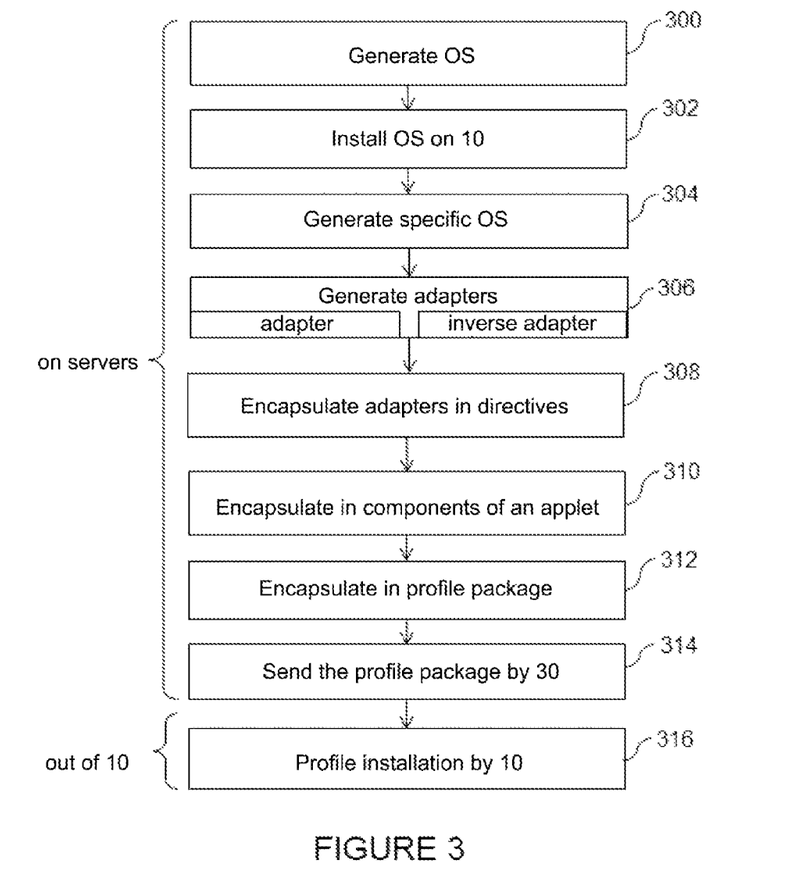
FIG. 3 shows, using a flowchart, general steps for the deployment of adapters according to the invention in a secure element.

FIG. 3 shows, using a flowchart, general steps for the deployment of adapters 211, 221 and inverse adapters 212, 222 in a secure element 10.

Beforehand, an initial runtime environment 100 (for example an operating system OS and/or a Java Card system with a Java Card virtual machine) is generated (step 300) for installation on secure element 10 (step 302) according to conventional techniques. For example, the installation of the runtime environment 100 can be carried out, in the factory plant, during the manufacturing, pre-personalization or personalization of the secure element 10. As a variant, it can be performed remotely by OTA (OTA standing for over-the-air—see for example the GSMA SGP 22 RSP standards—Technical Specification—Version 2.2.1 of Dec. 18, 2018, GSMA SGP.02—Remote Provisioning Architecture for Embedded UICC—Technical Specification—Version 4.0 of Feb. 25, 2019, GlobalPlatform Card—Remote Application Management over HTTP—Card Specification v2.2—Amendment B—version 1.1.3) via the remote server 30, for example during an update of the OS or the Java Card virtual machine.

At any time, a service provider (a mobile operator in the example below) may wish to install a service profile (a P2 mobile subscriber profile in the example below but which can also be a banking profile linked to a banking service, a transport profile linked to a transport service, etc.) in the secure element 10. Step 304 and the following steps are therefore carried out as many times as there are profiles to be installed, when these require an adaptation of the runtime environment 100.

To take into account the specific features of the service provided, the operator generates (step 304) a runtime environment specific to this service. This specific runtime environment is referred to hereinafter as "the runtime environment adapted to profile P2". This step can start from the initial runtime environment 100 as created in step 300.

Figure 4:
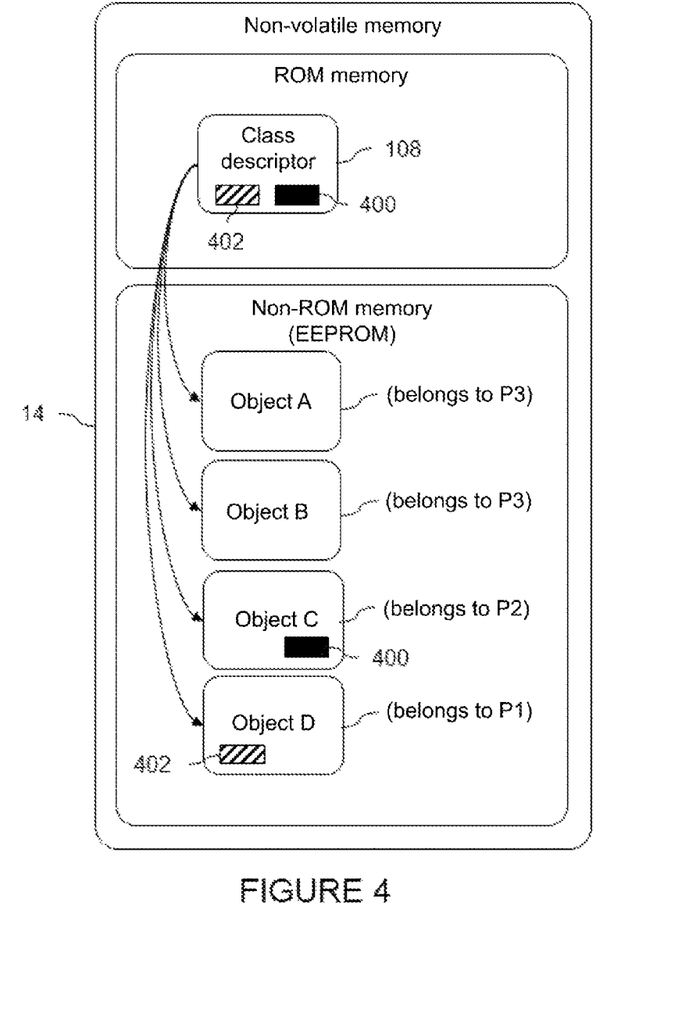
FIG. 4 shows an example of adaptation of a Java class according to an embodiment of the invention.

FIG. 4 shows an example of adapting an execution resource 108 based on Java technology, for example Java Card.

The execution resource 108 is herein a Java class descriptor as known in the background art, comprising for example interfaces, fields, methods and/or attributes. The Java class can be instantiated into objects used by profiles. In the example, objects A and B are two instances of the class 108 as provided for in the initial runtime environment 100 (i.e., created in step 300). Objects A and B were created for profile P3, which for example implement a method of the class defined in the initial runtime environment 100.

In the runtime environment specific to profile P2, the Java class descriptor is modified for example to include one or more modified interfaces, fields, methods and/or attributes that correspond to the specificities of the service of the MNO2 operator of profile P2. For example, a different method (than that provided for in class 108) may be required to carry out an operation of the MNO2 operator's service. An instantiation of this modified or "adapted" class is carried out through the object C, created for profile P2. Object C thus includes, for example, the modified method 400.

Likewise, in the runtime environment specific to profile P1, the Java class descriptor is modified to the specificities of the service of the operator MNO1 of profile P1. The object D instantiated for this profile thus includes, for example, the modified method 402.

Returning to FIG. 3, in step 306, the adapter 221 and the inverse adapter 222 specific to profile P2 considered are generated. Each adapter can in particular be the binary difference between the two runtime environments generated in steps 300 and 304: the adapter 221, the difference between the initial runtime environment 100 and the specific (or adapted) runtime environment in step 304 and the inverse adapter 222, the difference between the specific runtime environment of step 304 and the initial runtime environment 100.

In the case of FIG. 4, adapter 221 and inverse adapter 222 for profile P2 include the additive definition of additional components 400 (for adapter 221) and the subtractive definition of additional components 400 (for inverse adapter 222), respectively.

At step 308 of FIG. 3, the adapters generated 221, 222 are encapsulated in directives that can be interpreted by the adaptive routine 110 of the runtime environment 100. These directives are themselves encapsulated in step 310 in an application, typically a Java Card applet of type CAP file, as two additional components ("custom components" in the Java Card specification). The application may be marked, for example using a predefined header, as containing the adapters.

In step 312, this application is added to a package of profile P2, this package (Profile Package according to certain SIM Alliance standards) intended to be deployed in the secure element 10 in the field. The creation of a profile package for its installation in a secure element and the addition of applications therein are known to a skilled person. For example, the package can be generated according to the document "SIMalliance eUICC Profile Package Interoperable Format Technical Specification", Version 2.2.

Then the package is sent, via remote server 30, to the secure element 10, during step 314.

The next step 316 takes place in the secure element 10 receiving the sent package within which the adapters are located. In a known manner, secure element 10 installs profile P2 using the package received. A procedure for loading and installing a profile is for example disclosed in document "GSMA SGP.22—RSP Technical Specification", Version 2.1 of Feb. 27, 2017.

During installation, the runtime environment recognizes the marking of the applet of the adapters. It can thus process this applet to extract therefrom the interpretable directives (representing each of the adapters 221 and 222) and store them in connection with profile P2, for example in the ISD-P2 forming this profile. In other words, adapter 221 and inverse adapter 222 are stored in the memory reserved for profile P2 in secure element 10.

In a variant, only the adapter 221 of the initial runtime environment 100 is generated in step 306. In this variant, the inverse adapter 222 may be generated (and installed) by the secure element 10 for example during the installation of adapter 221 (step 316) or during the first use/application of adapter 221. In this case, it is the secure element 10 (and no longer an equipment at the plant or a remote server) that obtains the specific (adapted) runtime environment by applying the adapter received to the initial runtime environment 100, and then determines the binary difference between that specific runtime environment and the initial runtime environment 100 to build the inverse adapter.

Although FIG. 3 is disclosed in connection with an installation package of profile P2 in the secure element, the same mechanism can be implemented with an update package of profile P2.

Figure 5:
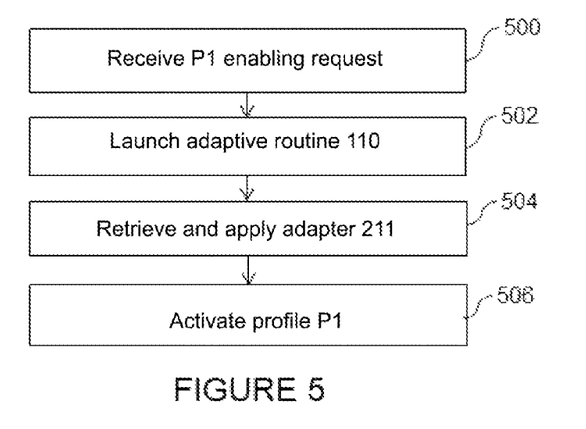
FIG. 5 shows, using a flowchart, general steps in the adaptation of a runtime environment upon enabling a profile, according to one embodiment of the invention.
Figure 6:
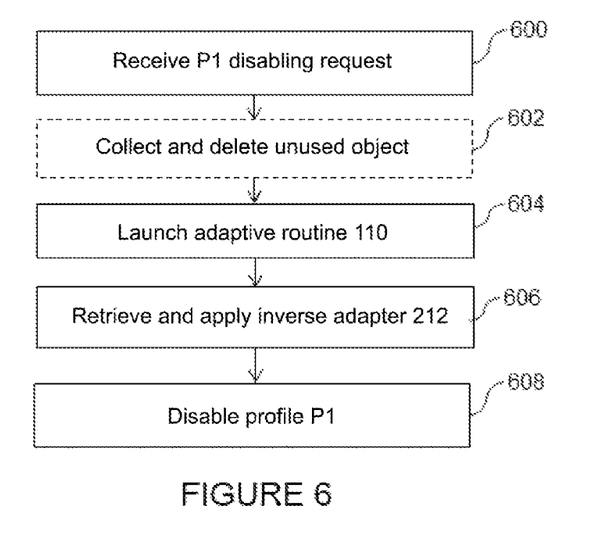
FIG. 6 shows, using a flowchart, general steps for the restoration of a runtime environment upon disabling a profile, according to one embodiment of the invention.
Figure 7:
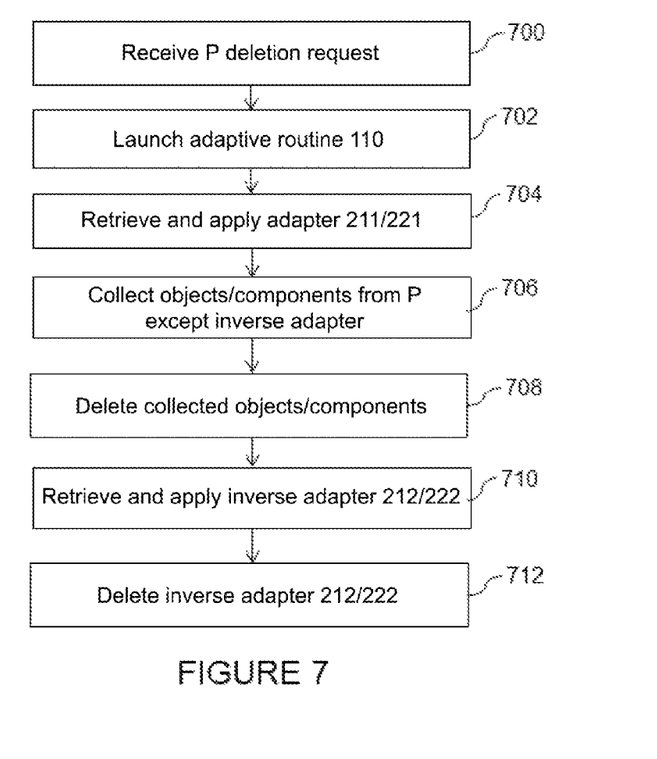
FIG. 7 shows, using a flowchart, general steps for the dynamic adaptation of a runtime environment upon deleting a profile, according to one embodiment of the invention.

FIGS. 5 to 7 show, using flowcharts, the use of adapters and inverse adapters according to the enabling, disabling and deletion of the associated profiles. These figures thus show how adapters and inverse adapters are applied according to the life cycle of the profiles.

FIGS. 5 and 6 show in particular the application of the adapters to the initial runtime environment 100 upon enabling one of the profiles and the application of the inverse adapters to the adapted runtime environment upon disabling or deleting the profile. A dynamic and just-in-time adaptation of the runtime environment to the different profiles successively enabled (then disabled) is thus obtained, by successively applying the steps of FIGS. 5 and 6.

There can be as many possible adaptations of the runtime environment as there are operators (or profiles). In the example of FIG. 4, class 108 is used to instantiate objects A and B whereupon profile P3 is active (the runtime environment not being adapted). Then profile P1 is enabled (instead of P3), the runtime environment being thus adapted as a result (with adapter 211 adding method 402) and object D is instantiated from class 108 modified with method 402 specific to P1. Then profile P2 is enabled (instead of P1), leading to the application of the inverse adapter 212 of P1 (disabling of P1) and the application of the adapter 221 of P2 to adapt the runtime environment to P2. Object C is then instantiated from class 108 modified with method 400 specific to P2.

In step 500, secure element 10, and more precisely the ISD-R 200, receives a command to activate a profile. In the example of FIG. 2, the command can request the enabling of the inactive profile P1. This request can also be interpreted as a command to disable, beforehand, the active profile, herein P2. In this case, the process of FIG. 6 is executed for disabling profile P2 before the process of FIG. 5 for enabling profile P1.

Examples of command and enabling procedure (Profile Enabling) are disclosed in documents GSMA SGP.02 ("Remote Provisioning Architecture for Embedded UICC Technical Specification", Version 3.2 of Jun. 27, 2017) and GSMA SGP.22.

In step 502, the ISD-R 200 begins the execution of the enabling command in a conventional manner. During this execution, the ISD-R 200 calls the adaptive routine 110 on behalf of the ISD-P1. In step 504, the adaptive routine 110 retrieves the adapter 211 of profile P1 to be enabled (and not the inverse adapter 212).

The nature of the command (enabling or disabling, for example) allows the adaptive routine 110 to retrieve either the adapter to adapt the initial runtime environment (enabling command) or the inverse adapter to restore it (disabling/deletion command).

The operating system of the eUICC constantly knows the current state of the runtime environment, that is which profile is active, by virtue of a stored persistent value that indicates, for example, the life cycle of the profiles. On the basis of this information, the adaptive routine 110 can therefore retrieve the appropriate adapter: Thus, the operating system continually knows which profile is currently active. If it appears that no profile is active and therefore that the runtime environment is not suitable, the adaptive routine 110 can then retrieve the adapter of the profile to be enabled in the event of an enabling command. On the other hand, if it appears that a profile is currently active, the adaptive routine 110 can retrieve the inverse adapter of the active profile in the event of a command to disable or delete this profile.

If no adapter is available (for example, because the profile does not require adaptation of the runtime environment), the method proceeds directly to step 506. As a variant, a default adapter can be stored with the adaptive routine 110 (with an inverse adapter corresponding by default), whichever adapter by default is applied by the routine in the absence of a specific adapter for the profile to be enabled.

Also in step 504, the adaptive routine 110 applies the adapter 211 retrieved to dynamically adapt the initial runtime environment 100 to profile P1. In the example of FIG. 4, class 108 is adapted to contain, for example, the modified method 400.

In step 506, the ISD-R 200 continues the execution of the enabling command in a conventional manner, resulting in the enabling of profile P1. The register storing an identifier of the active profile is updated (set to the value of the identifier of P1).

Profile P1 can thus be used in the adapted runtime environment. The adapted runtime environment operates totally according to the characteristics of the adapter applied, ensuring that the functions or data specific to operator MNO1 are available.

After use, profile P1 can be disabled (for example because another profile, P2 in the example, is enabled) in accordance with FIG. 6. In step 600, the ISD-R 200 therefore receives a disabling command (Profile Disabling) of profile P1.

In step 604, the ISD-R 200 begins the execution of the disabling command in a conventional manner. During this execution, the ISD-R 200 calls the adaptive routine 110. Either the indication of the profile (herein P1) to be disabled is indicated in the command, or the adaptive routine 110 can use the register storing an identifier of the active profile. In step 606, the adaptive routine 110 retrieves the inverse adapter 212 of profile P1 to be disabled. If no inverse adapter is available (for example, because the runtime environment did not need to be adapted to the active profile), the method proceeds directly to step 608 or, as a variant, the inverse adapter by default is retrieved.

Also in step 606, the adaptive routine 110 applies the retrieved inverse adapter 212 in order to restore the initial runtime environment 100. In the example of FIG. 4, class 108 is restored without the modified method 400.

In step 608, the ISD-R 200 continues the execution of the enabling command in a conventional manner, resulting in the disabling of profile P1. The register storing an identifier of the active profile is updated (set to 0).

In one embodiment, it may be beneficial to delete, from the memory, data of profile P1 to be disabled. This is the case, for example, with Java objects instantiated during the use of profile P1, in order to free up memory space 14 that may be limited in the secure element 10.

This operation is carried out by the garbage collector 112. According to one embodiment, it is configured to scan only the objects of the active profile with a view for collection. Indeed, if an object comes from a class that is adapted for a profile, the structure of this object is recognized only if the runtime environment is adapted. In other words, the garbage collector 112 runs the risk of not recognizing the structure of an object belonging to the profile P if the runtime environment is not adapted.

Additionally, care must be taken to limit the intervention of the garbage collector 112 to only the current profile in order to avoid any corruption (by unwanted deletion of objects) of another profile. Also, the objects will have been created in the JCRE while respecting, preferably, a partitioning of the profiles with one another, implying in particular that no object of one profile points towards an object of another profile. This allows for a simplified cleaning mechanism while also improving profile security.

The cleaning is thus carried out at the optional step 602 preceding the application of the inverse adapter (step 606) and consists in the ISD-R 200 launching an execution of the garbage collector 112 on behalf of the active profile (identifier indicated in the launch command or retrieved from the register storing the identifier of the active profile). This execution involves collecting instantiated objects (for example from class 108 but not only) for profile P1 only (the one to be disabled) and then the deletion thereof. The garbage collector 112 does not collect herein any eventual objects instantiated for other profiles or within the JCRE.

The objects instantiated for profile P1 can be those stored in a memory space reserved for the ISD-P1.

As a variant, the objects can be instantiated by the JCVM virtual machine by stamping them with a marking (or indicator) representative of their profiles. Thus, the garbage collector 112 can easily identify the objects linked to the profile P1 to disable.

According to another variant, it is possible to keep up to date a correspondence table that lists the objects created for each profile. Thus, the garbage collector 112 can quickly identify the objects linked to the profile P1 to be disabled.

According to another variant, it is possible to set up a set of indirections that indicates the locations (memory addresses) wherein the instantiated objects are stored for each profile.

Although this collection mechanism by the garbage collector 112 is presented in connection with the disabling of a profile, it can also be implemented during the deletion of a profile as disclosed below in connection with FIG. 7: the objects belonging to the profile to be deleted are collected by the garbage collector and then deleted.

According to another variant, the objects created can be collected at any time for deletion, for example during a memory saturation.

In this example of FIG. 5, the adaptation is carried out only once when profile P1 is enabled. As a variant, profile P1 may be enabled in a conventional manner without adaptation (at this stage) of the initial runtime environment 100 and an adaptation using the adapter 211 can be initiated (steps 502 and 504) during other events, for example each time the profile P1 is accessed. Access to profile P1 can take place during an authentication procedure (of a network, banking or transport service for example) or during a call to an application located in profile P1. In this variant, the initial runtime environment 100 can be restored (using steps 602 to 606) at the end of these operations, e.g., of the authentication procedure or of the execution of the application located in profile P1.

FIG. 7 shows some steps when deleting a profile.

In step 700, the secure element 10, and more precisely the ISD-R 200, receives a deletion command (Profile Deletion) of a profile P, for example in accordance with the GSMA documents mentioned herein before.

For efficient use of the garbage collector 112, the runtime environment is adapted to the profile to be deleted. Thus, in step 702, the ISD-R 200 calls the adaptive routine 110 on behalf of the profile to be deleted. In step 704, the adaptive routine 110 recovers the adapter 211 or 221 of the profile P to be deleted (and not the inverse adapter 212 or 222), then applies it so as to adapt the initial runtime environment 100 to profile P.

At step 706 (similar to step 602 disclosed herein before), the ISD-R 200, which takes over, initiates an execution of the garbage collector 112 on behalf of the profile P to be deleted. This execution involves the collection of the instantiated objects (from a recognized class, possibly adapted) for the profile P only (the one to be deleted) and then the deletion thereof.

In step 708, the ISD-R 200 deletes the constituent elements of profile P, in particular data and applications. During this operation, the inverse adapter 212 or 222 is added in the persistence roots of the JCRE in order to preserve it (it is not seen and therefore not deleted by the ISD-R 200).

Following this deletion of the constituent elements of the profile P, the initial runtime environment 100 can now be restored during step 710. For this to happen, the ISD-R 200 calls the adaptive routine 110 again, which retrieves the inverse adapter 212 or 222 of the profile P to be deleted, then applies it so as to restore the initial runtime environment 100.

In step 712, the ISD-R 200 deletes the inverse adapter from profile P (after removing it from the persistence roots of the JCRE). This step closes the complete deletion of profile P. The initial runtime environment 100 can thus regain control of the execution in the secure element 10.

In one embodiment, a runtime environment cleanup routine can trigger, upon command or periodically or any other event, a cleanup operation for unnecessary objects to free up memory space, even though no profile can be active. This routine can thus successively consider all, or part of the profiles installed (for example the profile or profiles determined according to a predefined rule—by way of illustration the last profile used) and for a profile P considered:

retrieving (step 702) and applying (step 704) the adapter of the profile P to obtain the adapted runtime environment;

launching the garbage collector 112 (step 706) to collect the objects of the profile P and delete them (step 708); then     retrieving and applying (step 710) the inverse adapter of profile P to restore the initial runtime environment.

The preceding examples are only non-limiting embodiments of the invention.

In particular, these examples mainly relate to a mobile phone application with subscriber profiles P1, P2, a mobile network infrastructure and mobile operators, they can be easily transposed to any type of service profile (including configurations according to GlobalPlatform), any type of remote server and any type of service provider.

The invention claimed is:

1. A secure element comprising:
    a processor;
    a storage;
    a communication interface;
    a plurality of service profiles;
    an initial runtime environment comprising resources stored in the storage, the initial runtime environment comprising an operating system of the secure element or a virtual machine executed by the operating system of the secure element;
    adaptive data for a selected one of the service profiles to adapt the resources of the initial runtime environment to obtain an adapted runtime environment adapted to the selected one of the service profiles;
    an adaptive routine configured to apply the adaptive data of the selected service profile to the resources of the initial runtime environment; and
    inverse adaptive data to restore the resources of the initial runtime environment from the adapted runtime environment, the adaptive routine being configured to apply the inverse adaptive data after using the selected service profile.

2. The secure element according to claim 1, wherein the adaptive routine is configured to apply the adaptive data and the inverse adaptive data based on the life cycle of the selected service profile.

3. The secure element according to claim 2, wherein the adaptive routine is configured to apply the adaptive data to the resources of the initial runtime environment upon enabling the selected service profile and to apply the inverse adaptive data to the resources of the adapted runtime environment upon disabling or deleting of the selected service profile.

4. The secure element according to claim 1, wherein the adaptive data and the inverse adaptive data are stored as lists of directives able to be interpreted by the adaptive routine.

5. The secure element according to claim 1, wherein the processor is configured to receive the adaptive data and the inverse adaptive data within an installation package of the selected service profile transmitted by an external equipment.

6. The secure element according to claim 1, wherein the processor is configured to generate the inverse adaptive data from the adaptive data received from a remote network equipment.

7. The secure element according to claim 1, further comprising another service profile of the services profiles selected from:
  a service profile able to be used in the initial runtime environment, and
  a service profile able to be used in a modified runtime environment obtained by applying other adaptive data different from said adaptive data to the resources of the initial runtime environment, the service profile able to be used in the modified runtime environment including the other adaptive data and other inverse adaptive data to restore the resources of the initial runtime environment from the modified runtime environment.

8. The secure element according to claim 1, further comprising a garbage collector collecting unreferenced profile resources stored in memory, the garbage collector being configured to collect only among specific profile resources linked to one or more specific service profiles of the plurality of service profiles.

9. The secure element according to claim 1, wherein the adaptive data are configured to adapt an initial Java class of the initial runtime environment to a format of an object instantiating the initial Java class in the first service profile, and the inverse adaptive data are configured to restore the initial Java class from the adapted Java class.

10. The secure element according to claim 1, wherein the adaptive data includes an application applicable to the plurality of service profiles and dedicated components applicable to the selected service profile.

11. The secure element according to claim 1, wherein the secure element receives a profile activation command to activate the selected service profile.

12. A method of execution in a secure element including an initial runtime environment and a plurality of service profiles, the method comprising:
  applying, by an adaptive routine, adaptive data for a selected one of the service profiles of resources of the initial runtime environment to obtain an adapted runtime environment adapted to the selected service profile;
  using the selected service profile in the adapted runtime environment; and
  then applying, by the adaptive routine, inverse adaptive data to the resources of runtime environment adapted to restore the initial runtime environment.

13. The method according to claim 12, wherein the adaptive data and the inverse adaptive data are applied based on a life cycle of the selected service profile.

14. The method according to claim 12, wherein the adaptive data are applied to the resources of the initial runtime environment upon enabling the selected service profile and the inverse adaptive data are applied to the resources of the adapted runtime environment when disabling or deleting the selected service profile.

15. The method according to claim 12, wherein the adaptive data and the inverse adaptive data are stored as lists of directives that are able to be interpreted by the adaptive routine.

16. The method according to claim 12, wherein the secure element further comprises another service profile of the service profiles selected from:
  a service profile able to be used in the initial runtime environment, and
  a service profile able to be used in the modified runtime environment obtained by applying other adaptive data different from said adaptive data to the resources of the initial runtime environment, the service profile able to be used in the modified runtime environment including the other adaptive data and other inverse adaptive data to restore the resources of the initial runtime environment from the modified runtime environment.

17. The method according to claim 12, wherein the secure element further comprises a garbage collector collecting unused profile resources stored in memory, the garbage collector being configured to carry out collecting only among specific profile resources linked to a specific service profile of the service profiles.

18. A non-transitory computer-readable storage medium storing instructions of a computer program configured to implement a method comprising:
  applying, by an adaptive routine, adaptive data of resources of an initial runtime environment 4 a secure element to obtain an adapted runtime environment adapted to a selected service profile of the secure element from a plurality of service profiles of the secure element, the initial runtime environment comprising an operating system of the secure element or a virtual machine executed by the operating system of the secure element;
  using the selected service profile in the adapted runtime environment; and
  then applying, by the adaptive routine, inverse adaptive data to the resources of the runtime environment adapted to restore the initial runtime environment.

* * * * *